(12) United States Patent
Buerkle et al.

(10) Patent No.: US 9,278,712 B2
(45) Date of Patent: Mar. 8, 2016

(54) METHOD AND CONTROL UNIT FOR DETERMINING A CUTTING TRAJECTORY OF A CURVE SECTION OF A ROADWAY

(75) Inventors: Lutz Buerkle, Stuttgart (DE); Michael Fischer, Reichenbach/Fils (DE); Thomas Maurer, Neuendettelsau (DE)

(73) Assignee: ROBERT BOSCH GMBH, Stuttgart (DE)

( * ) Notice: Subject to any disclaimer, the term of this patent is extended or adjusted under 35 U.S.C. 154(b) by 451 days.

(21) Appl. No.: 13/513,152

(22) PCT Filed: Nov. 30, 2010

(86) PCT No.: PCT/EP2010/068530
§ 371 (c)(1),
(2), (4) Date: Aug. 17, 2012

(87) PCT Pub. No.: WO2011/067252
PCT Pub. Date: Jun. 9, 2011

(65) Prior Publication Data
US 2013/0006473 A1    Jan. 3, 2013

(30) Foreign Application Priority Data
Dec. 4, 2009    (DE) .......................... 10 2009 047 476

(51) Int. Cl.
| | |
|---|---|
| *B62D 1/00* | (2006.01) |
| *G08G 1/16* | (2006.01) |
| *G06F 7/00* | (2006.01) |
| *B62D 15/02* | (2006.01) |
| *B60W 30/045* | (2012.01) |
| *B60W 30/12* | (2006.01) |
| *B62D 1/28* | (2006.01) |

(52) U.S. Cl.
CPC ........... *B62D 15/025* (2013.01); *B60W 30/045* (2013.01); *B60W 30/12* (2013.01); *B62D 1/28* (2013.01)

(58) Field of Classification Search
CPC . G05D 1/0212; G01C 21/3658; B60W 30/06; B60W 30/12; B60W 30/00; B60W 30/02; B60W 30/045; B62D 15/027; B62D 15/025; B62D 12/00; B62D 1/22
See application file for complete search history.

(56) References Cited

U.S. PATENT DOCUMENTS

| | | | | |
|---|---|---|---|---|
| 5,438,517 | A | * | 8/1995 | Sennott et al. ................ 701/470 |
| 5,684,696 | A | * | 11/1997 | Rao et al. ......................... 701/25 |
| 5,956,250 | A | * | 9/1999 | Gudat et al. ..................... 701/26 |

(Continued)

FOREIGN PATENT DOCUMENTS

| | | |
|---|---|---|
| CN | 101282853 | 10/2008 |
| DE | 10 2005 056 211 | 6/2007 |

(Continued)

*Primary Examiner* — James Trammell
*Assistant Examiner* — Demetra Smith-Stewart
(74) *Attorney, Agent, or Firm* — Kenyon & Kenyon LLP

(57) ABSTRACT

A method for determining a cutting trajectory that enables a curve section of a lane to be cut by a vehicle. In the method, information about the curve section is received, and the curve section is divided into at least one curve segment having a segment length and a start curvature, the curve segment being a straight-line segment or a circular arc segment or a curve segment whose curvature is a function of an arc length of the curve segment. This is followed by determination of a cutting trajectory from the at least one curve segment, so that, at a specific point of the curve section, the cutting trajectory has a predetermined offset relative to a center of the lane.

8 Claims, 8 Drawing Sheets

(56) References Cited

U.S. PATENT DOCUMENTS

| | | | |
|---|---|---|---|
| 6,169,940 B1* | 1/2001 | Jitsukata et al. | 701/23 |
| 7,469,765 B2* | 12/2008 | Spannheimer et al. | 180/204 |
| 8,862,436 B2* | 10/2014 | Samuel | 703/1 |
| 2003/0101036 A1* | 5/2003 | Nagel | 703/13 |
| 2006/0030987 A1 | 2/2006 | Akita | |
| 2010/0204866 A1* | 8/2010 | Moshchuk et al. | 701/25 |
| 2011/0015805 A1* | 1/2011 | Seger | 701/1 |
| 2011/0264327 A1* | 10/2011 | Nakai | 701/41 |
| 2012/0089294 A1* | 4/2012 | Fehse et al. | 701/25 |
| 2013/0060465 A1* | 3/2013 | Smartt | 701/461 |

FOREIGN PATENT DOCUMENTS

| | | |
|---|---|---|
| DE | 10 2008 003666 | 7/2009 |
| EP | 2 116 440 | 11/2009 |
| JP | 11-34898 | 2/1999 |
| JP | 2006-111184 | 4/2006 |
| JP | 2008-171114 | 7/2008 |
| WO | WO 2006/037445 | 4/2006 |
| WO | WO 2009/086966 | 7/2009 |

\* cited by examiner

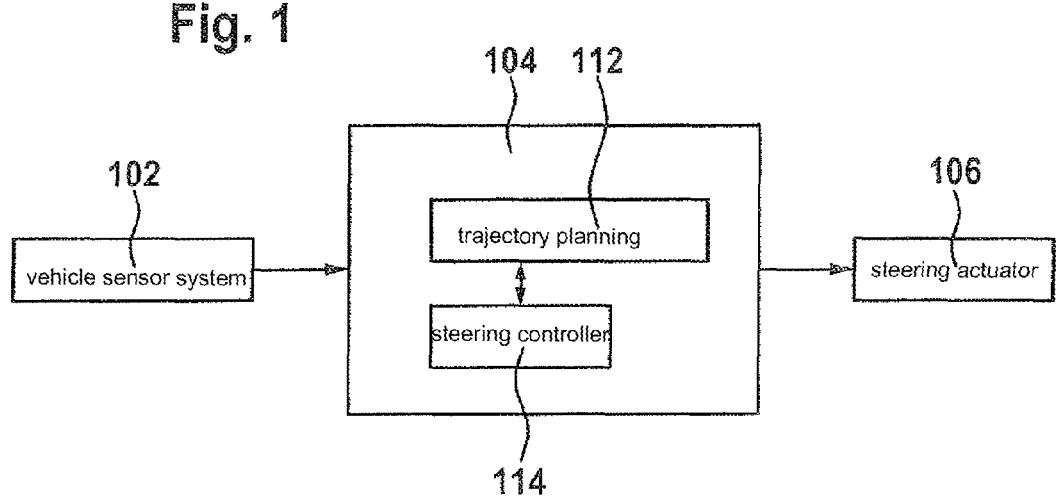
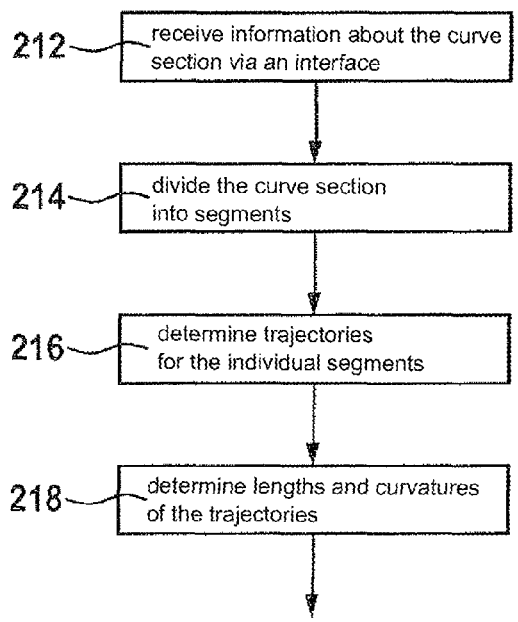

METHOD AND CONTROL UNIT FOR DETERMINING A CUTTING TRAJECTORY OF A CURVE SECTION OF A ROADWAY

FIELD OF THE INVENTION

The present invention relates to a method for determining a trajectory of a curve section of a roadway, to a control unit according to claim, and to a computer program product.

BACKGROUND INFORMATION

Lane Keeping Support (LKS) refers to lane keeping systems which assist the driver in holding the vehicle in the lane by directed steering moments. First LKS systems have already been brought onto the European market. They include a lane recognition system with which it is possible to determine the course of the lane ahead of the vehicle, for example the curvature and the change in curvature, and the relative position of the vehicle in the lane, for example the lateral distance and the differential angle. For that purpose, the traffic area in front of the vehicle is scanned with a video camera and the grayscale images are evaluated in a control unit. Where appropriate, data from further surround-sensors and information from a digital map may also be included to support and expand the video-based lane information when determining lane information.

German patent document DE 10 2005 056 211 A1 discusses a method for controlling the lateral movement of a vehicle, in which the course of a lane lying ahead is detected at least as far as a look-ahead distance, and a target trajectory for the vehicle is planned by a control unit.

SUMMARY OF THE INVENTION

Against that background, the exemplary embodiments and/or exemplary methods of the present invention present a method for determining a cutting trajectory that enables a curve section of a lane to be cut by a vehicle, and also presents a control unit that uses that method and, finally, a corresponding computer program product according to the independent patent claims. Advantageous embodiments will be apparent from the respective subordinate claims and from the following description.

On the basis of the course of a lane and on the basis of driving state variables, a target trajectory may be ascertained depending on the current driving situation of a vehicle, in order to guide the vehicle safely in the lane by continuous steering intervention. That trajectory may lie in the center between the left and right lane boundary. It is possible, therefore, to carry out regulation based on the center of the lane irrespective of structural road conditions and, in particular, irrespective of curves. The effect of this is unpleasant for the driver since it does not correspond to his own driving behavior.

When a driver negotiates curves that are sufficiently wide in his own lane, he will intuitively cut the curve. That driving behavior is unconsciously encouraged by widening of the roadway at curves. The reason for cutting a curve is that the lateral acceleration acting on the driver feels unpleasant and should therefore be reduced. The driver does this by reducing the curvature of the curve by cutting the curve, that is to say, even before the curve begins the driver begins to steer inward and his car therefore "turns into" the curve earlier. Hence, the curve is cut toward the edge of the lane and a smaller maximum steering angle is needed for negotiating the curve, which corresponds to a smaller curvature of the curve. That primarily increases driving comfort, but also increases driving safety.

The strategy according to the exemplary embodiments and/or exemplary methods of the present invention may be implemented, for example, by an LKS system and is able to take advantage of the possibility of cutting a curve within one's own lane.

The exemplary embodiments and/or exemplary methods of the present invention are based on the realization that the possibility of cutting a curve may be taken into consideration in trajectory planning for a lane keeping system of a vehicle.

An aspect of the exemplary embodiments and/or exemplary methods of the present invention is an algorithm for cutting curves in one's own lane when used with a driver assistance system for lateral guidance of a vehicle. In that manner, curve stability may be increased and greater comfort may be achieved.

According to the exemplary embodiments and/or exemplary methods of the present invention, cutting of curves within one's own lane may be made possible by an algorithm that knows the horizontal course of a route with a certain look-ahead distance. The cutting of curves may be parameterizable in its extent for the driver himself in order to imitate the driver's own driving style when negotiating curves. This results in a pleasanter driving sensation and greater driving safety.

Advantageously, the lateral acceleration during negotiation of curves of all kinds may be systematically reduced. An algorithm is able to ensure that, within certain limits, a trajectory is planned in such a way that the curves are cut easily and in a manner that is pleasant for the driver. That provides benefits for the vehicle's occupants in terms of safety and comfort.

Furthermore, it is possible to plan the lane while taking human steering behavior and the Road Layout Guideline ("Richtlinie für die Anlage von Straßen" (RAS)) into consideration. This means that the trajectory may be planned with the aid of clothoid segments. In particular, the continuous road curvature progression may be retained in order to achieve the best possible and driver-like steering behavior. This means that no unnatural steering movements occur, that is to say, only constant and uniformly increasing or decreasing steering angles are used. Thus, for entering a curve, for example, a constant steering angle alteration speed is achieved. This results in human-like, comfortable lateral guidance of the vehicle.

It is also advantageous that a widening of the roadway at curves may be usefully exploited. The degree of curve cutting is adjustable on request by the driver himself, even during travel. The fact that the trajectory followed by the system may be geared toward driver behavior makes it possible to increase customer acceptance of the LKS system.

With video-based lane recognition, position-finding and a digital map, it is possible to use existing sensors alone.

The exemplary embodiments and/or exemplary methods of the present invention provide a method for determining a trajectory that enables a curve section of a lane to be cut by a vehicle, which method includes the following steps: receiving information about the curve section via an interface; dividing the curve section into a straight-line segment having a straight-line length, into a clothoid segment having a clothoid length, a clothoid start curvature and a clothoid parameter, and into a circular arc segment having a circular arc length and circular arc curvature; determining a straight-line trajectory for the straight-line segment, a clothoid trajectory for the clothoid segment and a circular arc trajectory for the circular arc segment, based on an adjustment rule designed to adjust the straight-line length, the clothoid length, the clothoid start curvature, the clothoid parameter, the circular arc length and the circular arc curvature in such a manner that a curvature of the clothoid trajectory and a curvature of the circular arc trajectory is in each case less than a maximum curvature of the curve section; and determining the cutting trajectory from the straight-line trajectory, the clothoid trajectory and the circular arc trajectory.

The curve section may be a section of roadway lying ahead of the vehicle in the direction of travel, which may have a curvature. The information about the curve section may define, for example, a course of the curve section, a course of the curvatures within the curve section, for example over the stretch of roadway, specific characteristics of the curve section or a course of a width of the lane in the curve section. The information about the curve section may represent information that may be provided by a look-ahead surround-sensor system or a database containing corresponding roadway information. To locate a specific curve section, information provided by a positioning system may be used. The clothoid segment may represent a transition curve whose curvature increases linearly. The clothoid parameter may define a gradient of the curvature. The circular arc segment may have a uniform radius of curvature. A direction of curvature of the clothoid segment and circular arc segment may correspond to a direction of curvature of the curve section. Thus, the curve section may be represented by the straight-line segment, the clothoid segment and the circular arc segment. The cutting trajectory may represent a path of movement of the vehicle through the curve section. The cutting trajectory may have a lower maximum radius of curvature than a trajectory leading through the curve section centrally with respect to the lane. This results in the curve not being taken along a notional center line but being cut. The adjustment rule may be designed to adjust adjustable parameters, such as clothoid length, clothoid curvature, circular arc length and circular arc curvature, on the basis of predetermined or adjustable boundary conditions, for example a maximum offset between the cutting trajectory and the center of the lane. Suitable adjustment algorithms may be used for this. The adjustment rule may be designed to adjust one, more than one, or all of the parameters. With the aid of the parameters it is possible to adjust the course of the straight-line trajectory, clothoid trajectory or circular arc trajectory. The cutting trajectory may be created by stringing together the straight-line trajectory, the clothoid trajectory and the circular arc trajectory.

In addition to being divided into the clothoid segment and the circular arc segment, the curve section may further be divided into a straight-line segment having a straight-line length. Correspondingly, a straight-line trajectory may be determined for the straight-line segment on the basis of the adjustment rule, the adjustment rule being designed to adjust the straight-line length in such a manner that the maximum curvature of the clothoid trajectory and the curvature of the circular arc trajectory is in each case less than the maximum curvature of the curve section. In that case, the cutting trajectory may be determined from the straight-line trajectory, the clothoid trajectory and the circular arc trajectory. The straight-line segment lends itself to implementing, for example, a curve entry or curve exit according to the strategy of the present invention. Even when reference is made to the straight-line segment in the forms of embodiment and exemplary embodiments that follow, the examples in question may also be carried out without a straight-line segment. For example, when implementing a so-called unsymmetrical curve or a so-called S-bend, typically no straight-line segment is required.

An unsymmetrical curve is characterized by the fact that two circular arc segments with different curvatures of the same sign are joined to each other by a clothoid segment. In the case of an S-bend, on the other hand, two circular arc segments of differing sign are joined to each other by a clothoid segment.

The adjustment rule may be designed to determine the straight-line trajectory, the clothoid trajectory and the circular arc trajectory in such a manner that the cutting trajectory has, at an apex of the curve section, a predetermined offset toward the inside of the curve relative to a trajectory in the center of the lane. The predetermined offset may be a fixed offset or may be specified by the driver. The predetermined offset may be varied in that case in dependence on the width of the lane, especially at the apex. The predetermined offset may also be selected in dependence on a vehicle speed or a maximum curvature of the curve section.

The adjustment rule may further be designed to determine the straight-line trajectory, the clothoid trajectory and the circular arc trajectory in such a manner that an angular direction of a start point of the cutting trajectory corresponds to an angular direction of a start point of the trajectory on the center of the lane, and an angular direction of an end point of the cutting trajectory corresponds to an angular direction of an end point of the trajectory on the center of the lane. In that manner it is possible to avoid jerky steering movements at the start and end of the curve section. This strategy means that the straight-line trajectory, the clothoid trajectory and the circular arc trajectory may be determined in accordance with the adjustment rule in such a manner that, when the vehicle negotiates the curve section by following the cutting trajectory, it experiences the same change in yaw angle as when it negotiates the curve section by following the trajectory in the center of the lane.

For that purpose, the adjustment rule may be designed, for example, to determine the straight-line trajectory, the clothoid trajectory and the circular arc trajectory taking into consideration a vehicle speed and a curvature of the curve section. Thus, real parameters may be included in order to determine the cutting trajectory.

A further aspect of the exemplary embodiments and/or exemplary methods of the present invention is an approaching of curves. The radius of the vehicle trajectory may thereby be further increased, beyond merely cutting the curve, and more specifically by optimum utilization of the entire available width of the roadway, where applicable also the area of roadway before and after the actual curve.

This strategy of approaching curves is based on the realization that the greater the radius traveled, or the smaller the traveled curvature of the trajectory of the vehicle, the more passenger-friendly the ride characteristics become.

The smaller curvature results in a reduced lateral acceleration and a reduced force acting on the occupants. Advantageously, this increases safety since the vehicle is less likely to break away. In addition, passenger comfort is increased since lower lateral forces act on the body. Alternatively, a higher speed is possible when negotiating the curve.

In order to take a curve approach into consideration, the exemplary embodiments and/or exemplary methods of the present invention further provides an embodiment of a method for determining a trajectory, in which the adjustment rule is designed to determine, in a region directly adjoining the curve section, a further straight-line trajectory, a further clothoid trajectory and a further circular arc trajectory in such a manner that a further cutting trajectory has in the region a further predetermined offset with respect to the center of the lane. This makes it possible to approach and take the curve in such a way that a further minimization of the curvature for the overall curve trajectory is obtained. In other words, the adjustment rule may accordingly be designed to determine at least one further clothoid trajectory or curve trajectory that has a direction of curvature counter to a direction of curvature of the curve section. In this case, the cutting trajectory may be determined from the straight-line trajectory, the clothoid trajectory, the circular arc trajectory, and the at least one further clothoid trajectory.

The method according to the present invention may further include in the various forms of embodiment a step of ascertaining a lateral guidance of the vehicle based on the cutting trajectory, the lateral guidance being suitable for steering the vehicle through the curve section along the cutting trajectory. The method according to the present invention may therefore be used advantageously for a lane keeping system.

In order to be able to represent more complex roadway shapes, the method according to the present invention may include a step of dividing a route section of the roadway into a plurality of curve sections capable of representing a curve entry, an unsymmetrical curve, an S-bend and/or a curve exit. For each of the plurality of curve sections it is possible to determine a cutting trajectory in accordance with one of the preceding Claims, and a trajectory for the rote section may be formed by stringing together the cutting trajectories of the plurality of curve sections. The individual cutting trajectories may be determined sequentially, that is, one after the other. No iterations are required.

The present invention further provides a method for determining a cutting trajectory that enables a curve section of a lane to be cut by a vehicle, which method includes the following steps: receiving information about the curve section via an interface; dividing the curve section into at least one curve segment having a segment length and a start curvature, the curve segment being a straight-line segment or a circular arc segment or a curve segment whose curvature is a function of an arc length of the curve segment; determining a cutting trajectory from the at least one curve segment, so that at a specific point of the curve section the cutting trajectory has a predetermined offset relative to a center of the lane.

The function of an arc length may be a derivative. For example, the curvature may be a second derivative of the arc length. The specific point may be an apex, a central point or another suitable point of the curve section. The method may be implemented with the aid of suitable optimization methods. The curve segment may include a segment of a circle, a clothoid segment, a spline segment and/or a Bézier segment. Even when reference is made to the straight-line segment in the forms of embodiment and exemplary embodiments that follow, the examples in question may also be carried out without a straight-line segment. For example, when implementing a so-called unsymmetrical curve or a so-called S-bend, typically no straight-line segment is required.

The cutting trajectory may include at least one trajectory segment having the segment length and the start curvature, the trajectory segment being a straight-line segment or a circular arc segment or a curve segment whose curvature is a function of the arc length of the trajectory segment.

The cutting trajectory may be determined in this case in such a manner that a maximum curvature of the cutting trajectory is less than a maximum curvature of the curve section.

In accordance with one embodiment, the curve section may be divided into a plurality of curve segments having a segment length and a start curvature, the start curvature corresponding to an end curvature of a preceding curve segment and the curvature thereof either being constant over the arc length of the curve segment, in the form of a straight-line segment or circular arc segment, or changing linearly with the arc length of the curve segment, in the form of a clothoid segment.

The cutting trajectory may be divided into a plurality of trajectory segments having a segment length and a start curvature, the start curvature corresponding to the end curvature of a preceding trajectory segment and the curvature thereof either being constant over the arc length of the trajectory segment, in the form of a straight-line segment or circular arc segment, or changing linearly with the arc length of the trajectory segment, in the form of a clothoid segment.

The straight-line length, the clothoid length, the start curvature of the clothoid, the clothoid parameter, the circular arc length and the circular arc curvature may also be so adjusted that a maximum curvature of the clothoid trajectory and a curvature of the circular arc trajectory is in each case less than a maximum curvature of the curve section, and in which a straight-line trajectory is determined which is associated with the straight-line segment, a clothoid trajectory is determined which is associated with the clothoid segment, and a circular arc trajectory is determined which is associated with the circular arc segment, and in which the cutting trajectory (330) is determined from the straight-line trajectory, the clothoid trajectory and the circular arc trajectory.

In addition, the straight-line trajectory, the clothoid trajectory and the circular arc trajectory may be so determined that the cutting trajectory has, at an apex, a central point or another suitable point of the curve section, a predetermined offset toward the inside of the curve relative to the center of the lane.

In addition, the straight-line trajectory, the clothoid trajectory and the circular arc trajectory may be so determined that an angular direction of the cutting trajectory at a start point corresponds to an angular direction of the center of the lane at a start point and an angular direction of the cutting trajectory at an end point corresponds to an angular direction of the center of the lane at an end point.

The straight-line trajectory, the clothoid trajectory and the circular arc trajectory may be determined taking into consideration a vehicle speed and a curve section curvature.

In a region directly adjoining the curve section, a further straight-line trajectory, a further clothoid trajectory and a further circular arc trajectory may be so determined that a further cutting trajectory has, in the region, a further predetermined offset relative to the center of the lane.

The method may furthermore include a step of ascertaining a lateral guidance of the vehicle based on the cutting trajectory, the lateral guidance being suitable for steering the vehicle through the curve section along the cutting trajectory.

The method may also include a step of dividing a route section of the roadway into a plurality of curve sections representing a curve entry, a curve that becomes tighter or that opens out, an S-bend and/or a curve exit, and for each of the plurality of curve sections a cutting trajectory is determined in accordance with one of the preceding Claims, and a trajectory for the route section being formed by stringing together the cutting trajectories of the plurality of curve sections.

The present invention further provides a control unit which is configured to carry out or implement the steps of the method of the present invention. The object underlying the present invention may also to be attained quickly and efficiently through this variant of carrying out the invention in the form of a control unit.

A control unit may be understood here as being an electrical device that processes sensor signals and that outputs control signals in dependence on the sensor signals. The control unit may have an interface which may be in the form of a hardware and/or software interface. When in the form of hardware, the interfaces may be, for example, part of a so-called system ASIC which includes a wide variety of functions of the control unit. It is also possible, however, for the interfaces to be separate, integrated circuits or to consist at least to some extent of discrete components. When in the form of software, the interfaces may be software modules that are present, for example, on a microcontroller in addition to other software modules.

Also advantageous is a computer program product having program code which is stored on a machine-readable medium such as a semiconductor memory, a hard drive memory or an optical memory and which is used to carry out the method according to one of the embodiments described above when the program is run on a control unit.

The present invention is described in detail by way of example below with reference to the accompanying drawings.

BRIEF DESCRIPTION OF THE DRAWINGS

FIG. 1 is a block diagram of a layout of a trajectory planner according to an exemplary embodiment of the present invention.

FIG. 2 shows a flow diagram of a method according to an exemplary embodiment of the present invention.

DETAILED DESCRIPTION

Figure 3:
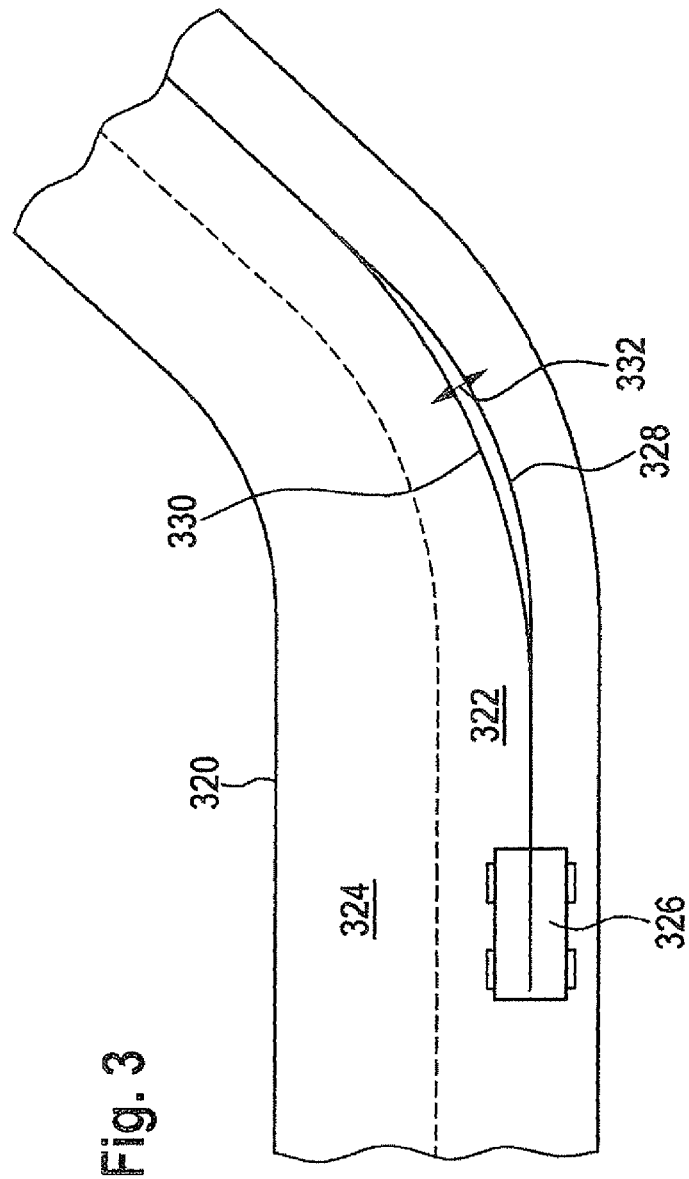
FIG. 3 shows a schematic representation of the cutting of a curve, according to an exemplary embodiment of the present invention.

In the following description of the exemplary embodiments of the present invention, the same or similar reference symbols are used for elements having a similar action which are shown in the various Figures, dispensing with a repeated description of those elements.

FIG. 1 shows a layout of a trajectory planner in accordance with an exemplary embodiment of the present invention. Shown therein are a vehicle sensor system 102, a lateral guidance system 104, and a steering actuator 106. The lateral guidance system 104 may have a device for trajectory planning 112 and a steering controller 114.

The vehicle sensor system is configured to acquire information suitable for the trajectory planning device 112 and to provide that information to lateral guidance system 104. Trajectory planning device 112 and the steering controller may be coupled to each other. Lateral guidance system 104 may be configured to ascertain a trajectory and provide steering information corresponding to the trajectory to steering actuator 106.

Trajectory planning device 112 may be integrated in an LKS system and may determine a trajectory as a target specification for a lateral controller 104.

The course of a route section lying ahead of the vehicle may be ascertained from a digital map and a current vehicle position. That course may be communicated to trajectory planning device 112 in sections in the form of straight-line segments, clothoid segments and circular arc segments. The reason for choosing those geometric shapes is that they guarantee a continuous linear curvature progression. The clothoid is the transition arc of two different constant curvature values of straight line and circular arc.

The data from the digital map may be combined with video data, for example from a look-ahead video system disposed on the vehicle. This is helpful, for example, in the case of outdated map material or poor GPS reception and it is possible to briefly compensate for deviations of the map data from actual curvatures. To ensure that amended input data are taken into account sufficiently quickly, the trajectory planning according to the present invention is able to run cyclically several times per second during the journey.

To make full use of the advantage of a theoretically unlimited look-ahead distance thanks to digital map data, the subsequent route sections are planned in advance. For a given course of a route section, it is possible to affect the current offset in an anticipatory manner. That is to say, an offset at the apex of the curve which is unfavorable for the upcoming curve section may be corrected in advance. That functionality may be combined very well with a speed recommendation for the curve section lying ahead of the vehicle.

Lateral guidance system 104 and especially trajectory planning device 112 may be configured to implement or carry out the method according to the present invention for determining a trajectory.

FIG. 2 shows a flow diagram of the method according to the invention in accordance with an exemplary embodiment of the present invention. The method may include a step 212 of receiving information about the curve section via an interface. The information may be provided, for example, by the vehicle's sensor system shown in FIG. 1. In a further step 214, division of the curve section into a clothoid segment, a circular arc segment and possibly a straight-line segment may be carried out. In a further step 216, trajectories may be determined for the individual segments. In accordance with the present invention, lengths and curvatures of the trajectories may be determined in such a manner that an overall trajectory may be determined from the individual trajectories in a further step 218. Step 216 may be skipped. In comparison with a trajectory extending in the center of a lane of the curve section, the overall trajectory may have a smaller maximum curvature. This may be achieved by determining the lengths and curvatures of the trajectories in step 216 in accordance with appropriate parameters. The overall trajectory may be used by a lane keeping system as a basis for steering the vehicle.

FIG. 3 shows a curve-cutting operation according to an exemplary embodiment of the present invention. Shown therein is a curve section 320 of a roadway having a first lane 322 and a second lane 324. A vehicle 326 is traveling in first lane 322. Vehicle 326 is able to move along a trajectory 328 extending centrally in first lane 322. According to the invention, a cutting trajectory 330 is ascertained which makes cutting of the curve possible with a lateral offset 332. Offset 332 marks a lateral offset or a lateral distance from lane center 328. Owing to lateral offset 332, cutting trajectory 330 extends on the curve's inner side of lane center 328. Lateral offset 332 may change over the course of cutting trajectory 330 and, for example, may be greatest at the apex of curve section 320. For example, the size of offset 332 may increase continuously from the start of curve section 320 to the apex and then decrease continuously to the end of curve section 320. At the start and end of curve section 320, offset 332 may be "zero".

An algorithm according the invention is able to ensure here that, when curve 320 is negotiated, the curvature of trajectory 330 systematically decreases relative to curve line 328 and, at the same time, a certain distance 332 from the center of the lane is maintained.

Curves are of a construction such that, after a straight line, the curvature value initially rises linearly with the arc length (curve entry with clothoid), then remains constant (circular arc with apex) or attains different curvatures each associated with clothoid segments, and then falls again (curve exit with clothoid). The number of curve parameters for a curve is therefore not fixed. The simplest curve consists of three segments (without the surrounding straight lines); an S-bend consists then of five segments (clothoid-circular arc-clothoid-circular arc-clothoid). A curve that becomes tighter or that opens out also consists of five segments (without the surrounding straight lines) which, however, all have the same sign of curvature. Furthermore, curve shapes that combine unsymmetrical curves and S-bends, and which therefore have a higher number of curve parameters, are also conceivable. Therefore, planning of the trajectory must be carried out for successive curve segments individually.

In that sense, the planning of the cutting curve is always carried out for a portion of the curve, consisting of straight line or circular arc, clothoid, circular arc or straight line. This produces four cases (so-called basic elements) which, when combined with one another, are able to describe every possible roadway shape.

Figure 4:
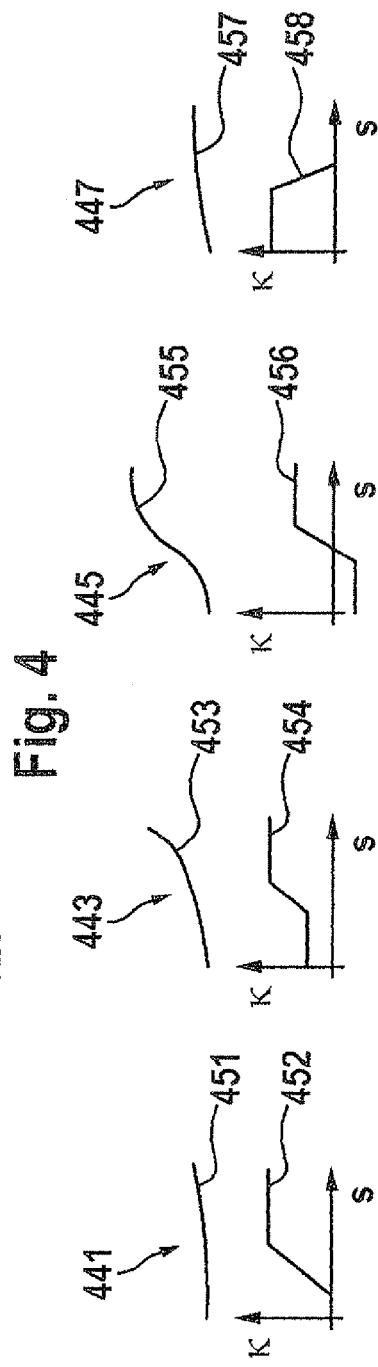
FIG. 4 is a schematic representation of four basic elements according to the invention.

FIG. 4 shows a representation of four basic elements, in accordance with different exemplary embodiments of the present invention, each shown with x-y coordinates in the upper part of the drawing and with corresponding curvature data in the lower part of the drawing, which represent the progression of the curvature over distance traveled.

A first basic element represents a curve entry 441, a second basic element an unsymmetrical curve 443, a third basic element an S-bend 445 and a fourth basic element a curve exit 447.

In the case of a curve entry 441, the elements straight line, clothoid and circular arc are linked together, and in the case of curve exit 447 circular arc, clothoid and a further straight line are linked together. An unsymmetrical curve 443 consists of a circular arc, a clothoid and a circular arc. Thus, curvatures with the same sign of curvature are illustrated, which become tighter or open out. S-bends 445 are composed of the same elements except that, in the clothoid portion, the curvature has a zero crossing and the sign changes, but the change in curvature continues to remain constant. For a simple right-hand bend, therefore, two basic elements are required. The first basic element, for the curve entry, may extend to halfway along the circular arc (apex of the curve). Basic elements do not necessarily have to be separated halfway along the circular arc. The place where separation occurs may also be specified by a parameter. The second basic element, for the curve exit, seamlessly adjoins the preceding basic element, which may be from halfway along the same circular arc, and extends as far as the straight line. The procedure is the same with the unsymmetrical curve and the S-bend, which may be combined with each other and which must be started and ended with a curve entry and a curve exit.

The problem of planning a trajectory has therefore been reduced within the four basic elements to six parameters in each case for the curvature description $(s_1, \kappa_1)$, $(s_2, \kappa_2)$ and $(s_3, \kappa_3)$ and the associated boundary conditions and the side conditions. It is necessary to ensure with the aid of the boundary conditions that the linking together of the basic elements in the x-y description is continuous and differentiable. In addition, in the s-κ description, continuity and the sweeping of the same yaw angle must be guaranteed. In that manner, the modularization of the trajectory planning into the individual basic elements is kept consistent.

The boundary conditions ensure that the curvature is reduced and the shape of the curve is preserved. The planning within the basic elements is carried out in such a way that, for cutting a curve, a maximum lateral offset value from the center of the lane at the apex is selected as a parameterizable quantity. The six free parameters are selected in such a way that that value must be attained by the end point of the trajectory. Accordingly, a point is specified which the trajectory to be generated for the curve entry should intersect with the same yaw angle as the central line of the lane at the apex of the curve. Making further assumptions, which will be presented in more detail hereinafter, the new intersection point is reached with a reduced maximum curvature and thus the lateral acceleration is systematically reduced and ride comfort is increased.

For curve entry 441, a course of a trajectory 451 and a coordinate system with a curvature plot 452 over distance is shown. In the coordinate system, distance s is entered on the abscissa and curvature κ is entered on the ordinate. Trajectory 451 has in a first region no curvature, in a central region a linearly increasing curvature and in an end region a constant curvature value not equal to zero.

For unsymmetrical curve 443, a course of a trajectory 453 and the coordinate system with a curvature plot 454 over distance is shown. Trajectory 453 has in a first region a constant curvature value not equal to zero, in a central region a linearly increasing curvature and in an end region a constant curvature value not equal to zero.

For S-bend 445, a course of a trajectory 455 and the coordinate system with a curvature plot 456 over distance is shown. Trajectory 455 has in a first region a constant first curvature value not equal to zero, in a central region a linearly increasing curvature and in an end region a constant second curvature value not equal to zero. The first and second curvature values have different signs, since the direction of curvature of S-bend 445 reverses over the course of the distance traveled.

For curve exit 447, a course of a trajectory 457 and a coordinate system with a curvature plot 458 over distance is shown. Trajectory 457 has in a first region a constant curvature value not equal to zero, in a central region a linearly decreasing curvature and in an end region no curvature.

The curve shapes shown have been chosen merely by way of example. Thus, curvature values may also have a negative sign. Particularly in the case of unsymmetrical curve 442 and S-bend 445, the central region of curvature plots 454, 456 may also decrease linearly or, expressed in general terms, may change linearly.

Accordingly, the course of a road may be divided into the four basic elements, that is, curve entries 441, curve exits 447 and curve sections having a changing curvature with identical curvature signs 443 (unsymmetrical curve section) and different curvature signs 445 (S-bend section).

The four basic elements 441, 443, 445, 447 may each be composed of three geometric shapes, with a clothoid segment always being placed as a transition between two different curvature values in order to ensure a continuous curvature. Basic elements 441, 443, 445, 447 are each handled individually, i.e., a trajectory with which the curve may be suitably cut is ascertained with an algorithm, and they are strung together in a manner corresponding to the course of the route section. To ensure a seamless and smooth transition, certain side conditions must be observed for handling the individual basic elements 441, 443, 445, 447.

Figure 5:
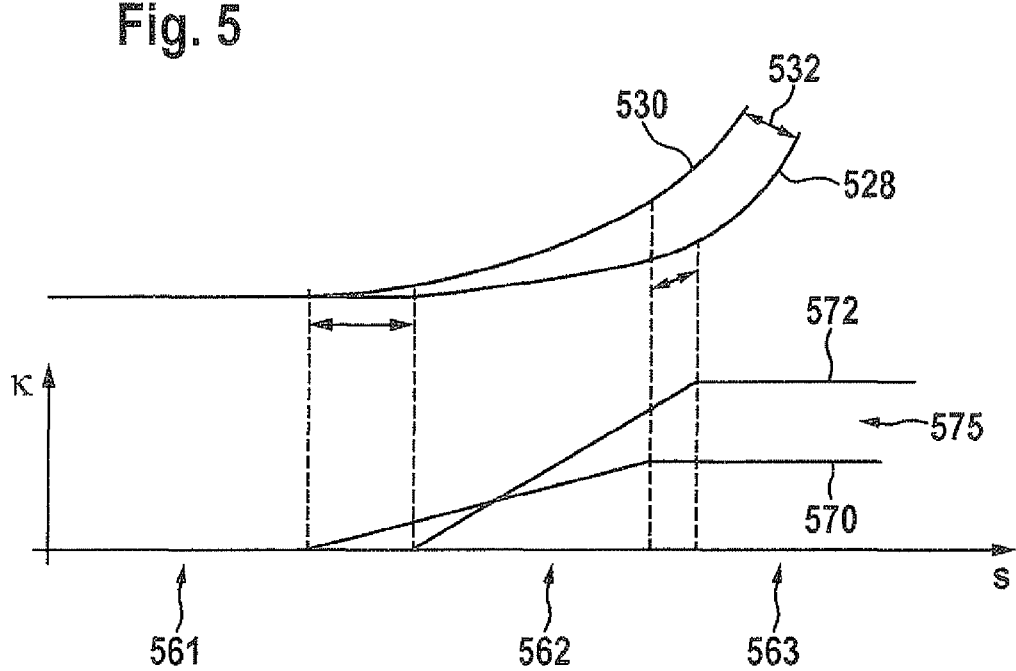
FIG. 5 is a schematic representation of the cutting of a curve, according to a further exemplary embodiment of the present invention.

FIG. 5 shows the cutting of a curve using a curve entry as an example.

In the upper portion of the drawing, a trajectory 528, a planned cutting trajectory 530 and a lateral offset 532 are shown. Trajectory 528 may correspond to the actual course of the curve, for example along the center of the lane. Trajectory 528 is divided into three sections, a first section having no curvature, a second section having a linearly increasing curvature and a third section have a constant maximum curvature. Cutting trajectory 530 has a maximum curvature that is less than the maximum curvature of trajectory 528. Offset 532 becomes larger in the direction toward the end of the curve and, at the end point of both trajectories 528, 530, has a value A_s.

Entered on the abscissa is the arc length s. It applies to curvature plots 570, 572, but not to trajectories 528, 530.

In the lower portion of the drawing, a coordinate system is shown in which the distance s is entered on the abscissa and the curvature κ on the ordinate. A first section 561, a second section 562 and a third section 563 are shown, which may correspond to the corresponding sections of trajectory 528 or cutting trajectory 530. In the coordinate system, a curvature plot 570 for trajectory 528 and a curvature plot 572 for cutting trajectory 530 are plotted. In first section 561, both curvature plots 570, 572 are equal to zero. Typically, a length of the straight line of curvature plot 572 for cutting trajectory 530 in first section 561 is shorter than the length of the straight line of curvature plot 570 for trajectory 528. In second section 562, curvature plot 570 has a smaller gradient than curvature plot 572. In third section 563, a reduction 575 in the maximum curve curvature is shown in the case of curvature plot 570, which is associated with planned cutting trajectory 530, in comparison with curvature plot 572.

In order to determine cutting trajectory 530, first the target offset 532 A_s at the apex and then a maximum curvature or a length of the segment of a circle in third section 563 may be defined. Based on this, it is possible to determine a curvature and a length of the clothoid segment in second section 562 and finally a length of the straight-line segment in first segment 561, so that certain side conditions are met and initial sections of trajectories 528, 530 coincide in respect of offset and angular direction.

In order to obtain a given offset value 532 at the apex of the curve, it is thus possible, for example for the basic element curve entry composed of straight line, clothoid and circular arc, to vary the lengths of the three segments and the curvature of clothoid and circular arc, as shown in FIG. 5.

The particular target offset value A_s 532 at the apex of the curve may depend on the curve speed and the maximum curvature of the curve. To obtain the illustrated course of curve 530, the following conditions must be met. The first condition is that the finished planned basic element is capable of being seamlessly inserted into the course of the trajectory. A further condition is that the transitions at the junctions are smooth in each case, which means that the cutting trajectory should produce the same yaw angle change in the vehicle as the trajectory over the lane center. Furthermore, the steering angle should only follow natural movements, that is, the steering angle should increase and decrease continuously and approximately linearly with time, that is, with constant steering speed. In addition, the planned cutting curve should basically reproduce the course of the route section in order to ensure a sensible course of cutting trajectory 530. The last proviso is that cutting of the curve takes place with guaranteed reduced curvature and steering movement and, at the same time, the vehicle does not leave the lane at any time.

The effects on the individual curvature sections and on the course of trajectory 530 are illustrated in FIG. 5 in sections 561, 562, 563. In third section 563, the maximum curve entry curvature is reduced and the segment length is retained (similar course of the cutting trajectory). As a consequence, the clothoid segment in second section 562 becomes longer in order to ensure a smooth progression at the junctions (identical yaw angle). The straight-line segment in first section 561 becomes shorter in order to reach the offset point that is being aimed for. The only freely parameterizable values in that curve section are the length of the circular arc in third section 563 and the length of the desired offset 532 at curve apex A_s. There is always a solution with a reduced maximum curve curvature.

The lateral distance to be maintained from the center of the lane, the planned trajectory curvature and the planned angle with respect to the lane center may be passed by the trajectory planning device to the LKS controller as new requirements. Those data may also be adjusted with lane information from the on-board video sensor system in order to compensate for incorrect map information.

When the vehicle follows the planned curve, a greater lateral deviation is obtained with less curvature and hence with a smaller steering movement. This also causes less steering work for the electrical steering actuator.

Figure 6:
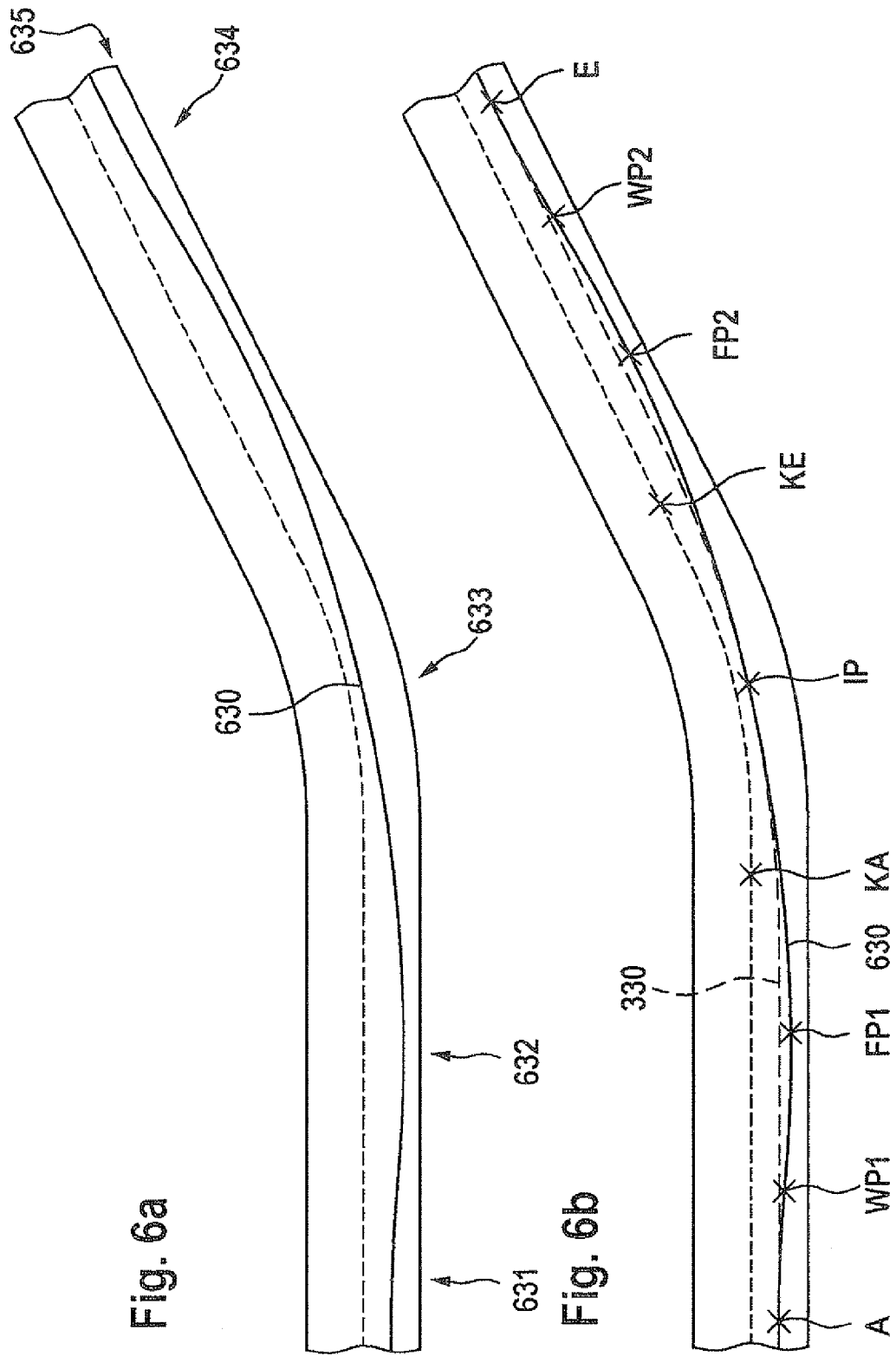
FIG. 6a is a schematic representation of a curve trajectory, according to an exemplary embodiment of a curve approach.
FIG. 6b is a further schematic representation of a curve trajectory, according to an exemplary embodiment of the curve approach.

FIGS. 6a and 6b are directed to further exemplary embodiments of the present invention, in which a curve approach is made. The curve approach is made in order to minimize the trajectory radius, where appropriate with curve-cutting, as described in the further exemplary embodiments.

FIG. 6a shows a schematic representation of a curve trajectory 630 in accordance with an exemplary embodiment of the present invention, in which a curve approach is made. In this case, a curve approach is made to minimize the curvature for the overall curve trajectory. At position 631, steering to the right is performed in order to reach an outer position 632 of the lane. In addition, an inner apex 633 is shown. At the curve end 634, taking of the curve at the outermost extremity and then a return 635 to the lane center take place. In that manner, a further minimization of curvature may be achieved, minimized further than without an approach.

The boundary and side conditions relating to why and how the individual segments (straight line, clothoid, circular arc) in the four basic elements are to be handled and the resulting effects are formulated below.

Figure 7:
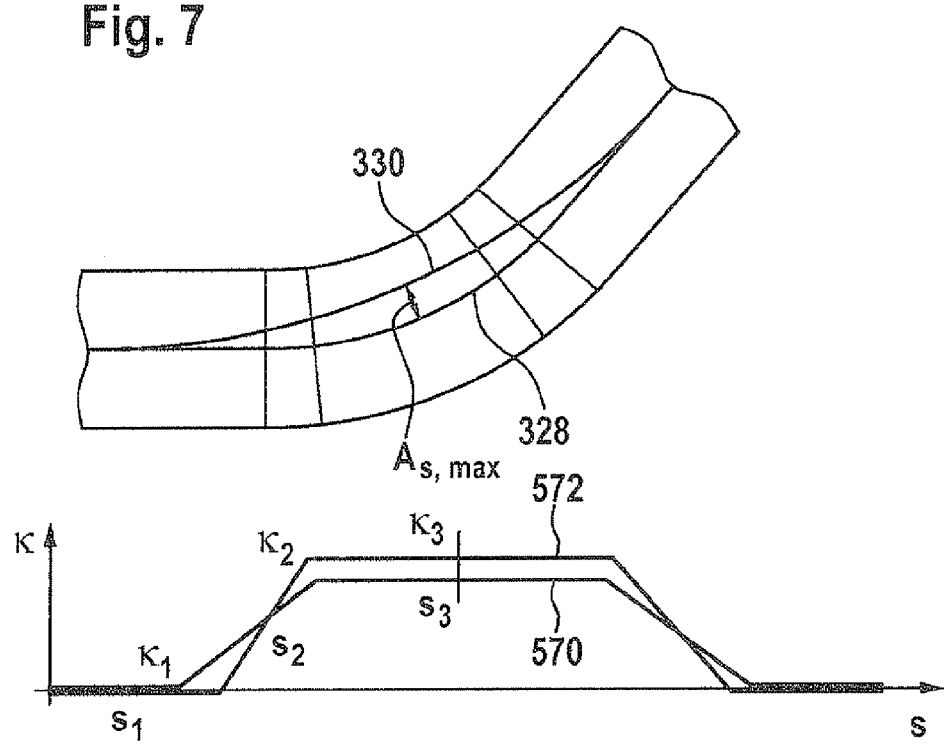
FIG. 7 is an illustrated representation for formulation of the boundary and side conditions, according to a further exemplary embodiment of the present invention.

A basic element consists of six parameters $(s_1, \kappa_1)$, $(s_2, \kappa_2)$ and $(s_3, \kappa_3)$. By variation of those parameters, based on the course of a route section a trajectory is generated which satisfies the required conditions as to the x-y and s-κ plot, as illustrated in FIG. 7.

FIG. 6b shows a further schematic representation of curve trajectory 630 shown in FIG. 6a, in accordance with a further exemplary embodiment of the present invention.

The Figure shows a roadway section with two lanes separated by a central line. The roadway section has a curve. Curve trajectory 630 extends in places over the lane on the outside of the curve. Also shown is cutting trajectory 330 which may be determined in accordance with the exemplary embodiment described with reference to FIG. 3. In the curve, a start of the actual curve KA and an end of the curve KE are marked. Entered on curve trajectory 630 are a start point A, a first turning point of the curvature WP1, a first base point FP1, an apex point of the curve IP, a second base point FP2 and a second turning point of the curvature WP2.

It is possible to reduce the effective trajectory radius by placing base points FP1, FP2 of curve trajectory 630 not on the center of the lane, as shown in FIG. 3, but as far as possible toward the outside edge of the roadway so that the connecting curve trajectory 630 acquires a greater radius. This means that base points FP1, FP2 must at the same time be placed before the start of curve KA and after the end KE, and thus produce a virtual lengthening of the curve. Base points FP1, FP2 are accordingly at the same time trajectory points that are closest to the outer side of the roadway. The distance is parameterizable or, for example, may also be set by the driver. The same applies to the distance at the apex of the curve IP where the vehicle comes closest to the neighboring lane (analogously to the determination of the apex of cutting trajectory 330).

How points A, FP, E, etc. are ultimately to be chosen and placed will be given by the topology of the roadway. The aim is to minimize the maximum trajectory curvature of curve trajectory 630 ultimately taken, under the boundary conditions mentioned.

The overall trajectory thus includes, in addition, a segment of pulling out, delimited by points A and WP1, and a segment of pulling in again, delimited by points WP2 and E. The pulling-out segment involves a curve approach in which travel is at first counter to the main curve direction in order to reach the outside edge of the roadway. Ditto for pulling in again to the center of the lane.

The curve segment for negotiating the main curve, that is to say, between first turning point WP1 and second turning point WP2 of the curvature, also covers, therefore, a greater circular arc distance than the curve itself is long. The segment referred to as the curve segment may also be represented by one or more clothoid segments or other function elements. The method of approach described in FIG. 6 may also serve analogously as an extension to the further exemplary embodiments. Cutting trajectory 330 would in that case be replaced by curve trajectory 630 with its additional clothoid and circular arc segments.

FIG. 7 shows an illustrated representation for formulating the boundary and side conditions. In the upper region, an x-y plot of a lane center 328 and a course of a planned trajectory 330 are shown. In the lower region, an s-κ plot with a curve plot 570 for lane center 328 and a curve plot 572 for planned trajectory 330 are shown.

At the start and end of the basic element under consideration, connection conditions to the preceding/following basic element must be satisfied. The procedure is as follows. In a curve, the basic elements are identified on the basis of the curvature segments (straight line, clothoid, circular arc). The curve entry is modified by minimizing the curvature and adapting the segment lengths. Thus, the calculated apex is reached as the end point of the curve entry trajectory, as shown in FIG. 8.

Figure 8:
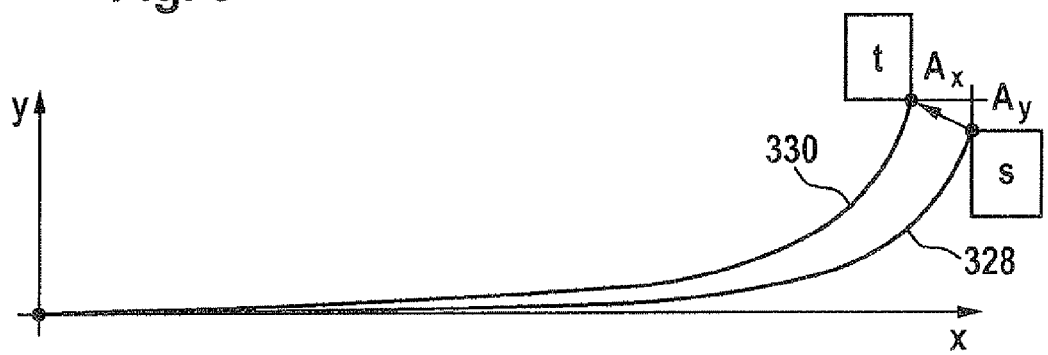
FIG. 8 shows a trajectory planning operation in an x-y coordinate system, according to a further exemplary embodiment of the present invention.

FIG. 8 shows trajectory planning in an x-y coordinate system, planned trajectory T 330 arising from section S 328. A basic prerequisite for this is that trajectory T has the same start point as section S. This is provided for by the coordinate transformation which ensure a continuous and differentiable x-y plot at the coordinate origin.

The end point of trajectory T results from the vectorial addition of the maximum lateral offset at a right angle to the end point of section S, that is, $$x_T - (x_s + A_x) = 0 \tag{4.8}$$

$$y_T - (y_s + A_y) = 0 \tag{4.9}$$

Here, $A_x$ and $A_y$ are the components of $A_{s,max}$ in the x-y coordinate system and are defined as $$A_x = -\text{sgn}(\kappa_3) \cdot \sin(\psi_E) \cdot A_{s,max} \tag{4.10}$$

$$A_y = \text{sgn}(\kappa_3) \cdot \cos(\psi_E) \cdot A_{s,max} \tag{4.11}$$

where $\Psi_E$ represents the yaw angle at the end point of the section in the basic element. Those equations are to be solved under the additional assumption that the yaw angle at the new apex T remains the same as at the old apex S. That assumption is important inter alia for preserving the curve shape and the modularity of the trajectory planning in the basic elements. For optimization, the offset at the apex and the new curvature of the circular arc are given to the next part of the curve. The optimization of the upcoming part of the curve takes those values into consideration and itself calculates a new curvature at the apex with appropriate segment lengths.

The side conditions placed on the x-y plot are as follows. The maximum offset is to lie at the apex of the trajectory and, in addition, is to depend on the expected lateral acceleration and a human factor. The location of the apex is given by the division of the course of the route section into the basic elements. Test drives by test drivers revealed that, in the overwhelming number of cases, the maximum lateral offset was reached in the middle of the circular arc portion. The basic elements are established in accordance with that observation, and thus also the apices of the trajectory. The location of the apex remains parameterizable in order to be able to adapt the trajectory planning to different demands/types of driver. The choice of a circular arc length may be used as a tuning parameter for adjusting the trajectory shape. It makes sense for the length of the segment that most influences the curve shape, i.e., that has the greatest curvature, to be always kept constant. Depending on the basic element, that condition may also be used as a supplementary factor if a degree of freedom is not dealt with by the other conditions.

The side condition that has to be formulated in the s-κ plot is the reduction of the maximum curvature. That condition is implemented with $$\kappa_3 < \kappa_3^s \tag{4.12}$$

where $\kappa_3^s$ is the curvature of the third segment of the route section. The continuity in the curvature progression furthermore results from the requirements of the RAS (Richtlinie für die Anlage von Straβen=Road Layout Guideline) and therefore $$\kappa_2 < \kappa_3 \qquad (4.13).$$

Figure 9:
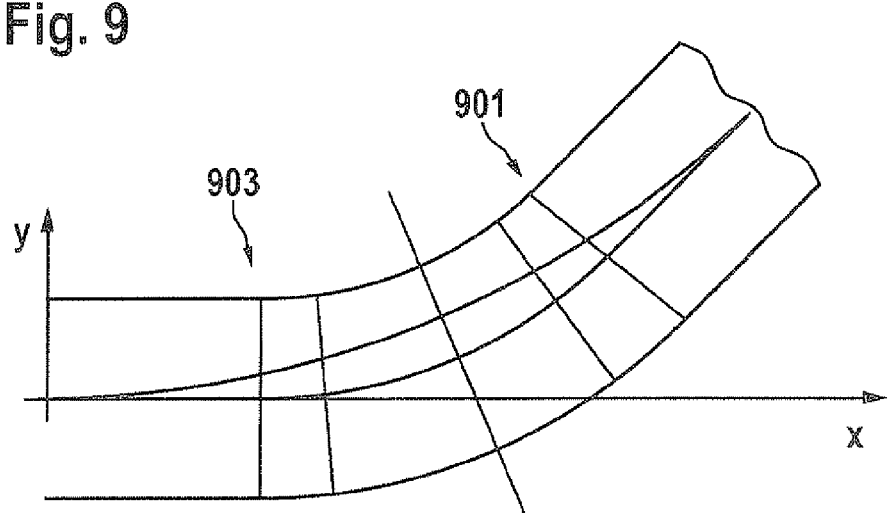
FIG. 9 shows boundary conditions in the x-y plot of the trajectory, according to a further exemplary embodiment of the present invention.

The boundary conditions result from the division of the course of the route section, and hence also the course of the trajectory, into the four basic elements. So that those basic elements may be linked to one another continuously, in the x-y plot and the s-κ plot the following measures must be taken. The x-y plot of the trajectory must, like the route section, be continuous and differentiable, as shown in FIG. 9. A continuous progression is provided for by satisfying equations (4.8) and (4.9). Differentiability is achieved by linking the x-y plot of the trajectory of a following basic element 901 to the preceding basic element 903 at the correct angle. These requirements are illustrated in FIG. 10 for the s-κ plot.

Figure 10:
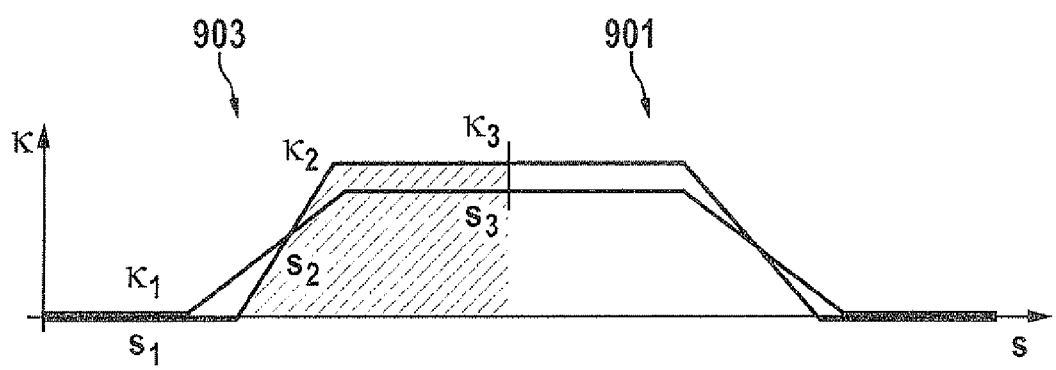
FIG. 10 shows boundary conditions in the x-y plot of the trajectory, according to a further exemplary embodiment of the present invention.

FIG. 10 shows the boundary conditions in the x-y plot of the trajectory. A continuous progression is provided for by satisfying equations (4.8) and (4.9). Differentiability is achieved by linking the x-y plot of the trajectory of a following basic element 901 to the preceding basic element 903 at the correct angle.

The s-κ plot is to be continuous and therefore the first curvature value $\kappa_1$ is determined by the end curvature of the preceding basic element.

The trajectory must furthermore sweep the same yaw angle as the route section of the basic element so that start and end point of the basic element are adjusted to the correct angle. That condition may be implemented in a simple manner in the s-κ plot since the yaw angle is given by $$\psi = \int_0^l \kappa(s) ds \qquad (4.14)$$

where l describes the length of the curvature progression in question. This means, in the case of a curve entry, that the triangle under $\kappa_2$ and the rectangle under $\kappa_3$ must together have the same surface area as the surface area under $\kappa_2^s$ and $\kappa_3^s$. This gives $$\int_0^l \kappa(s) ds - \int_0^{l^s} \kappa^s(s) ds = 0 \qquad (4.15)$$

where $$l = \sum_i s_i$$

applies for the trajectory and $$l^s = \sum_i s_i^s$$

applies for the route section, where i=1,2,3.

Thus, the conditions placed on the trajectory are generally fixed. They are to be adapted in each case to the application in the individual basic elements as follows.

In the following, the four basic elements are considered individually. Each of the three segments in each case has to be varied in length and end curvature in accordance with the boundary and side conditions that have been established, more specifically in such a way that the conditions may be applied to the four elements consistently. What is described here, therefore, is the translation of the conditions into an algorithm.

First, the trajectory planning for the basic element curve entry will be described.

The first part of a curve is always the curve entry, which consists of a straight line with the parameterization $(s_1^s, \kappa_1^s)$, a clothoid with $(s_2^s, \kappa_2^s)$ and a circular arc with $(s_3^s, \kappa_3^s)$. The three segments are described with end curvature and length, so that the Cartesian coordinates and the yaw angle of the complete curve entry trajectory may be calculated. It should be noted here that, when forming the basic element, the first and third segment lengths are halved so that the curve sections before and after the curve entry may be attached in the correct length and hence the curve apex lies halfway along the circular arc and represents the end point of the trajectory.

The problem now is to find a trajectory that has as the start point the coordinate origin and as the end point the point $$\begin{pmatrix} x_T \\ y_T \end{pmatrix},$$

that is, $$x_T - (x_s + A_x) = 0 \qquad (4.16)$$

$$y_T - (y_s + A_y) = 0 \qquad (4.17)$$

where $x_T = f_x(s_1, s_2, s_3, \kappa_3)$ and $y_T = f_y(s_2, s_3, \kappa_3)$, which means that the boundary conditions for the continuity in the x-y plot are satisfied.

Owing to the side conditions, the parameter $\kappa_1$ is already set to $\kappa_1 = 0$, and in addition $\kappa_2 = \kappa_3$.

One boundary condition states that the yaw angle at the end point of the trajectory is equal to that of the route section, see equation (4.14). That condition may be rewritten as $$0.5 \cdot s_2 \kappa_3 + s_3 \kappa_3 - 0.5 \cdot s_2^s \kappa_3^s - s_3^s \kappa_3^s = 0 \qquad (4.18)$$

$$s_2 = 2\left(\frac{\kappa_3^s}{\kappa_3}(0.5 \cdot s_2^s + s_3^s) - s_3\right) \qquad (4.19)$$

Thus, all previous boundary and side conditions are satisfied. It still holds that $y_T = f_y(\kappa_3, s_3)$.

The length of the circular arc $s_3$ remains as a free parameter and is adjusted in such a way that the shape of the trajectory is similar to that of the curve, whereby $$s_3 = s_3^s \qquad (4.20).$$

There is now sought a curvature value $\kappa_3$ and a length value $s_1$ that solves the equations $$y_T(\kappa_3) - (y_s + A_y) = 0 \qquad (4.21)$$

$$x_T(s_1) - (x_s + A_x) = 0 \qquad (4.22)$$

The function $f_y$ has a unique solution for the triplet $s_2$, $s_3$, $\kappa_3$. Thus, $x_T = f_x(s_1)$. Once equation (4.17) has been satisfied, the correct x-value of the trajectory may therefore be adjusted explicitly by way of $s_1$ since it has no effect on the y-value.

A limitation that may arise from the length of $s_1^s$ is that it is not possible for the specified lateral offset to be attained. It must be at least sufficiently long that it may be used to cut the curve. On considering equation (4.19), the reason becomes clear. The yaw angle condition states that as $\kappa_3$ becomes smaller the length of the clothoid $s_2$ must increase. As a result of the curve being cut, the overall length of the basic element is shortened, which results in an additional shortening of $s_1$. The length $s_1$ is therefore used in the determination of the curve-typical upper limit for the apex offset $A_{s,max}$.

For solving equation (4.21) there remains as a variable parameter $\kappa_3$ which, for the root-finding operation, is set to the start value $$\kappa_3^* = \kappa_3^s \quad (4.23).$$

The root-finding operation is given $\kappa_3 < \kappa_3^s$ as a side condition.

Figure 11:
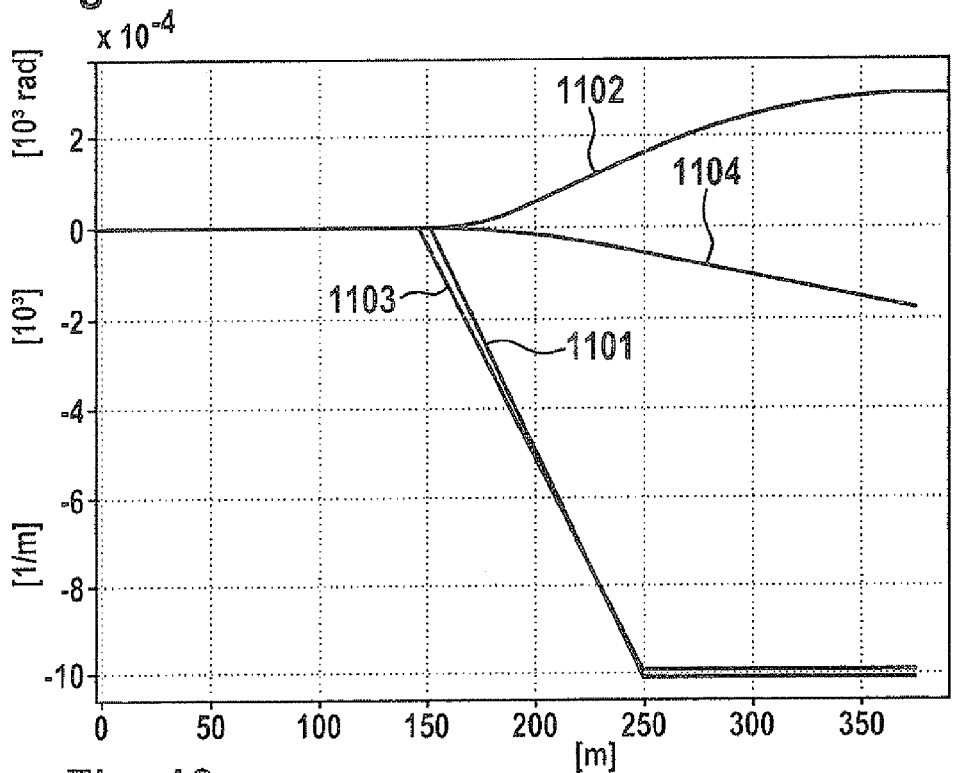
FIG. 11 shows a result of the trajectory planning operation for the curve entry, according to a further exemplary embodiment of the present invention.

FIG. 11 shows, as the result of the trajectory planning for curve entry 1101, relative lateral offset 1102, curvature plot 1003 and yaw angle plot 1104.

In the following, the trajectory planning for the basic element curve exit is described.

The curve exit consists, mirror-symmetrically to the curve entry, of a stringing together of the segments circular arc, clothoid and straight line. To keep down the programming work involved, the problem of finding the trajectory for the curve exit is transformed and treated as a curve entry by interchanging the $1^{st}$ and $3^{rd}$ segment and turning the clothoid around accordingly. The segments are parameterized as a straight line ($s_1^s$, $\kappa_1^s$), a clothoid ($s_2^s$, $\kappa_2^s$), and a circular arc ($s_3^s$, $\kappa_3^s$).

Since, for the LKS controller, the new offset must be determined over the distance, it is necessary to transform the offset and distance vector back after the trajectory planning operation. For that purpose, the vectors are re-stored from back to front. In addition, the distance vector must be corrected for the offset so that the first entry lies in the coordinate origin. That applies correspondingly to the curvature and yaw angle data.

The method for determining the curve exit trajectory differs from the method at the curve entry in that in this case the offset at the curve apex $A_{s,max}$ and the minimized curvature $\kappa_3$ have already been specified. It is only necessary to apply to the trajectory the conditions that produce continuous and smooth transitions to the curve sections before and after the curve exit. Two curvature parameters have already been specified with $\kappa_1 = 0$ and $\kappa_2 = \kappa_3$.

Satisfying the continuity in the x-y plot gives $$x_T - (x_s + A_x) = 0 \quad (4.24)$$

$$y_T - (y_s + A_y) = 0 \quad (4.25)$$

where $x_T = f_x(s_1, s_2, s_3)$ and $y_T = f_y(s_2, s_3)$.

The transformed start point of the cutting trajectory must lie on the straight-line segment of the middle line of the curve, and the end point must lie on the curve apex, that is, the end point of the preceding curve section.

The parameter $s_2$ is used to satisfy the yaw angle condition. This gives $$0.5 \cdot s_2 \kappa_3 + s_3 \kappa_3 - 0.5 \cdot s_2^s \kappa_3^s - s_3^s \kappa_3^s = 0 \quad (4.26)$$

$$s_2 = 2 \cdot \left(\frac{\kappa_3^s}{\kappa_3}(0.5 \cdot s_2^s + s_3^s) - s_3\right) \quad (4.27)$$

As in the case of the curve entry, owing to the fact that equation (4.25) is independent of parameter $s_1$, this equation is solved before equation (4.25) is then solved explicitly for $s_1$.

The root-finding operation in (4.25) may then be initialized with the start condition $$s_3^* = s_{3,0} \quad (4.28).$$

Once $s_2$ and $s_3$ have been found by solving (4.25), $s_1$ may be ascertained by solving (4.24).

Figure 12:
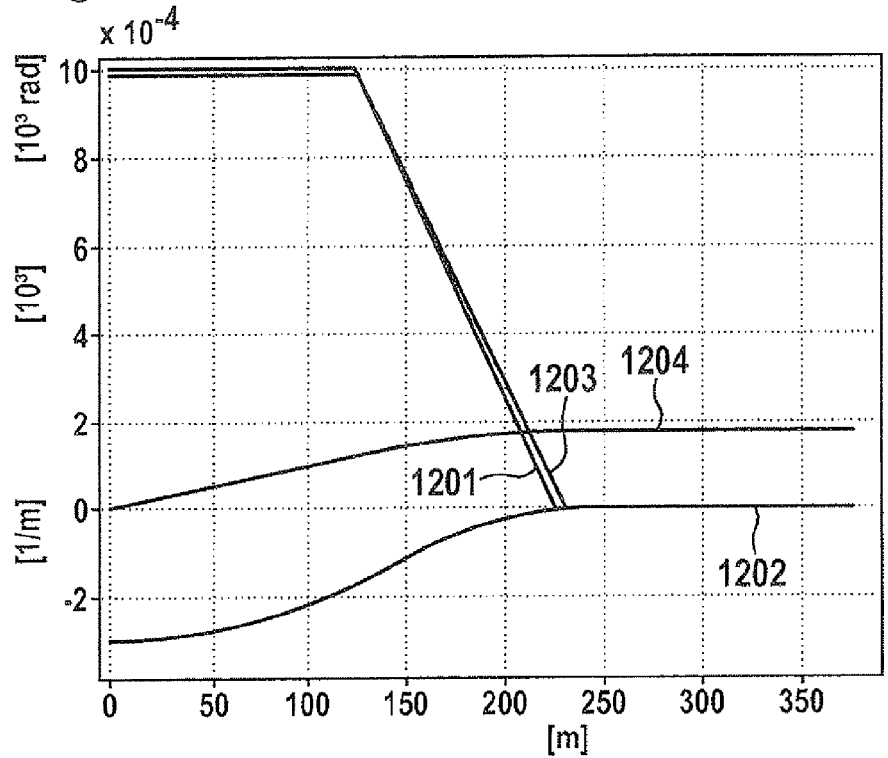
FIG. 12 shows a result of the trajectory planning operation for the curve exit, according to a further exemplary embodiment of the present invention.

FIG. 12 shows, as the result of the trajectory planning, routing 1201, relative lateral offset 1202, curvature plot 1203 and yaw angle plot 1204.

In the following, the trajectory planning for the basic element unsymmetrical curve is described.

An unsymmetrical curve refers here to a curve that has a curvature not equal to zero which is constant in sections. The geometric elements used are a circular arc ($s_1^s$, $\kappa_1^s$), a clothoid ($s_2^s$, $\kappa_2^s$), and a second circular arc ($s_3^s$, $\kappa_3^s$). The curvatures $\kappa_1^s$ and $\kappa_1^s$ have in this case the same sign. As the basic equation, once again the continuity conditions for the x-y plot are chosen, thus $$x_T - (x_s + A_x) = 0 \quad (4.29)$$

$$y_T - (y_s + A_y) = 0 \quad (4.30)$$

where $x_T = f_x(s_1, s_2, s_3)$ and $y_T = f_y(s_1, s_2, s_3, \kappa_3)$.

The curvature $\kappa_1$ in the first circular arc part of the trajectory is already specified by the previous trajectory section. There remain the four degrees of freedom in ($s_1$, $s_2$, $s_3$, $\kappa_3$) in order to generate the cutting curve. As conditions in addition to the above-mentioned continuity conditions in the xy plot and s-$\kappa$ plot there remain the yaw angle condition and the requirement that the shape of the curve is to be preserved. The parameters of both equations must now be determined in dependence on one another.

The start point of the trajectory is the apex of the previous cutting trajectory, the end point is the new apex determined with the aid of $A_{s,max}$.

The yaw angle is given by $$s_1 k_1 + 0.5 \cdot s_2(k_1 + k_3) + s_3 k_3 - s_1^s k_1^s - 0.5 \cdot s_2^s(k_1^s + k_3^s) - s_3^s k_3^s = 0 \quad (4.31)$$

$$s_2 = \frac{2s_1^s k_1^s + s_2^s(k_1^s + k_3^s) + 2s_3^s k_3^s - 2s_1 k_1 - 2s_3 k_3}{k_1 + k_3} \quad (4.32)$$

An unsymmetrical curve may involve either a curve that becomes tighter or a curve that opens out. To satisfy the condition that the trajectory is to have a course similar to the roadway, in the case of a curve that becomes tighter, where $|\kappa| < |K_3^\wedge|$, the last remaining degree of freedom in $s_3$ is specified as $$s_3 = s_3^s. \quad (4.33)$$

Alternatively, in the case of a curve that opens out, where $|\kappa| > |K_3^s|$, the parameter $s_1$ is used, giving $$s_1 = s_1^s. \quad (4.34)$$

That degree of freedom may be used, as for the curve entry, as a tuning parameter to make the planned trajectory additionally parameterizable for the test drives.

The equation system (4.29) and (4.30) is solved with the aid of a two-dimensional root-finding operation $$x_T(s_1, \kappa_3) - (x_s + A_x) = 0 \quad (4.35)$$

$$y_T(s_1, \kappa_3) - (y_s + A_y) = 0$$

This results, for the case of a curve that becomes tighter, in a root-finding operation for $s_1$ and $\kappa_3$ with the initial conditions $$s_1^* = s_1^s \tag{4.36}$$

$$\kappa_3^* = \kappa_3^s \tag{4.37}$$

The equation is to be solved taking the side conditions $\kappa_3 < \kappa_1^s$ into consideration.

As in the case of the curve entry, the length of the second circular arc segment $s_3$ was set to the length $s_3^s$. In addition, an attempt is made to reach a specific x-y coordinate value by using a reduced curvature $\kappa_3$. In this case, a further parameter must also be included; on analogy with the curve exit, that parameter is the length of the first circular arc segment $s_1$.

As in the two preceding cases, the correct yaw angle is set over the length of the clothoid $s_2$. The root-finding operation for the unsymmetrical curve is thus made up of a root-finding operation in two variables, the solution to the problem consisting of a synthesis of the solutions for the curve entry and curve exit.

Figure 13:
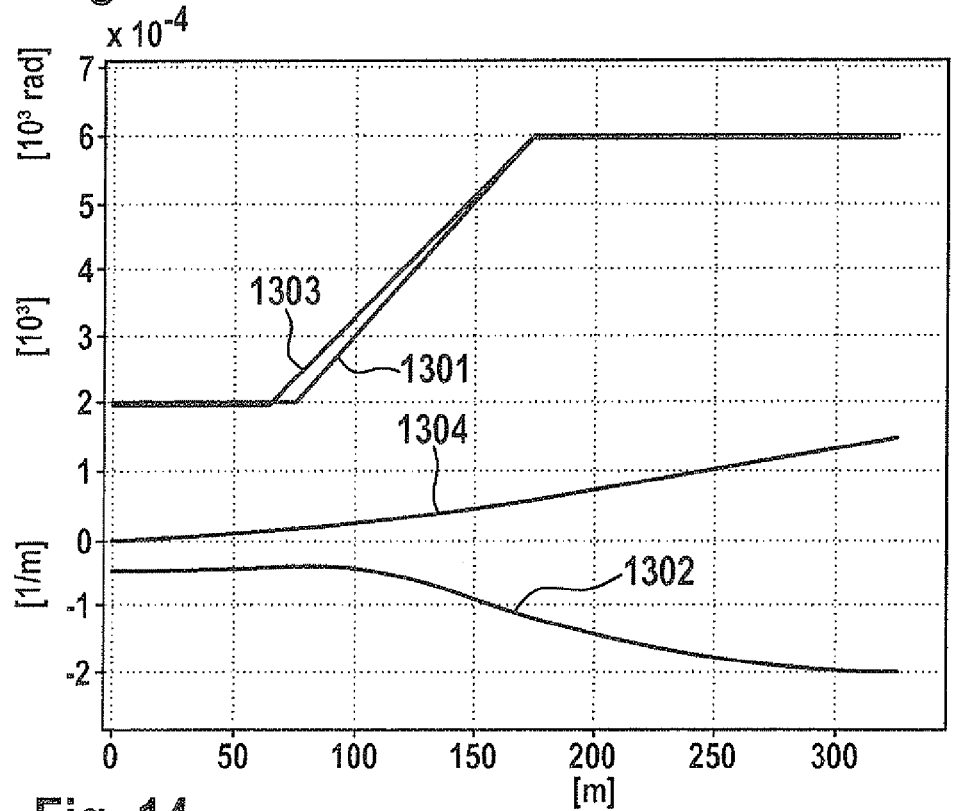
FIG. 13 shows a result of the trajectory planning operation for an unsymmetrical curve, according to a further exemplary embodiment of the present invention.

FIG. 13 shows, as the result of the trajectory planning for an unsymmetrical curve 1301, relative lateral offset 1302, curvature plot 1303 and yaw angle plot 1304 of a curve that becomes tighter.

In the following, the trajectory planning for the basic element S-bend is described.

The S-bend differs from the unsymmetrical curve in that the curvatures of the two circular arcs have different signs. The curve is parameterized with a circular arc $(s_2^s, \kappa_2^s)$, a clothoid $(s_2^s, \kappa_2^s)$, and a second circular arc $(s_3^s, \kappa_3^s)$.

As the basic equations, once again the continuity conditions for the x-y plot are chosen, that is, $$x_T - (x_s + A_x) = 0 \tag{4.38}$$

$$y_T - (y_s + A_y) = 0 \tag{4.39}$$

where $x_T = f_x(s_1, s_2, s_3)$ and $y_T = f_y(s_1, s_2, s_3, \kappa_3)$.

The curvature $\kappa_2$ of the first circular arc element of the trajectory is already determined in the preceding trajectory section. For generating the trajectory, there remain the four degrees of freedom $(s_2, s_2, s_3, \kappa_3)$. Further conditions, in addition to the continuity conditions in the x-y plot and s-$\kappa$ plot, are the yaw angle condition and the condition that the curve shape is to be preserved. The formulation of that condition differs from the preceding formulations since, in the case of an S-bend, the circular arc elements are often approximately point-symmetrical in the curvature progression and in the x-y plot. Therefore, it is not sensible to keep one clothoid length constant while changing the other, since the trajectory shape would deviate considerably from the curve shape as a result. The parameters of both equations must again, as in the case of the unsymmetrical curve, be determined in dependence on one another.

One degree of freedom provides for the yaw angle condition to be met. The following must apply $$F = s_1 \kappa_1 + 0.5 \cdot s_2 (\kappa_1 + \kappa_3) + s_3 \kappa_3 \tag{4.40}$$

$$F^s = s_1^s \kappa_1^s + 0.5 \cdot s_2^s (\kappa_1^s + \kappa_3^s) + s_3^s \kappa_3^s \tag{4.41}$$

$$F = F^s \tag{4.42}$$

where $F$ and $F^s$ describe the integral of the curvature over distance. The next degree of freedom is used to meet the condition that the cutting curve roughly retains the shape of the route section. The lengths of the circular arc segments are set into relation as follows:

$$\frac{s_1}{s_1^s} = \frac{s_3}{s_3^s} \tag{4.47}$$

$$s_3 = \frac{s_1}{s_1^s} s_3^s \tag{4.48}$$

If one now substitutes the equations (4.40), (4.41) and (4.48) into (4.42), the length of the first circular arc element as a function of $s_2$ and $\kappa_3$ is obtained:

$$s_1 = \frac{s_1^s \kappa_1^s + 0.5 \cdot s_2^s (\kappa_1^s + \kappa_3^s) + s_3^s \kappa_3^s - 0.5 \cdot s_2 (\kappa_1 + \kappa_3)}{\kappa_1 + \frac{s_3^s}{s_1^s} \kappa_3} \tag{4.49}$$

If, in that equation, the denominator becomes zero, equation (4.42) is solved for $\kappa_3$, which prevents the existence of a discontinuity point. The free parameters therefore change and $\kappa_3 = h(s_2, s_1)$.

The remaining two degrees of freedom are used to meet the continuity condition in the x-y curve. This is given by the equations $$x_T(s_2, \kappa_3) - (x_s + A_x) = 0 \tag{4.50}$$

$$y_T(s_2, \kappa_3) - (y_s + A_y) = 0$$

This results in a root-finding operation for $s_2$ and $\kappa_3$ with the initial conditions $$s_2^* = s_2^s \tag{4.51}$$

$$\kappa_3^* = \kappa_3^s \tag{4.52}$$

The equation is to be solved taking the side condition $\kappa_3 < \kappa_3^s$ into consideration.

Figure 14:
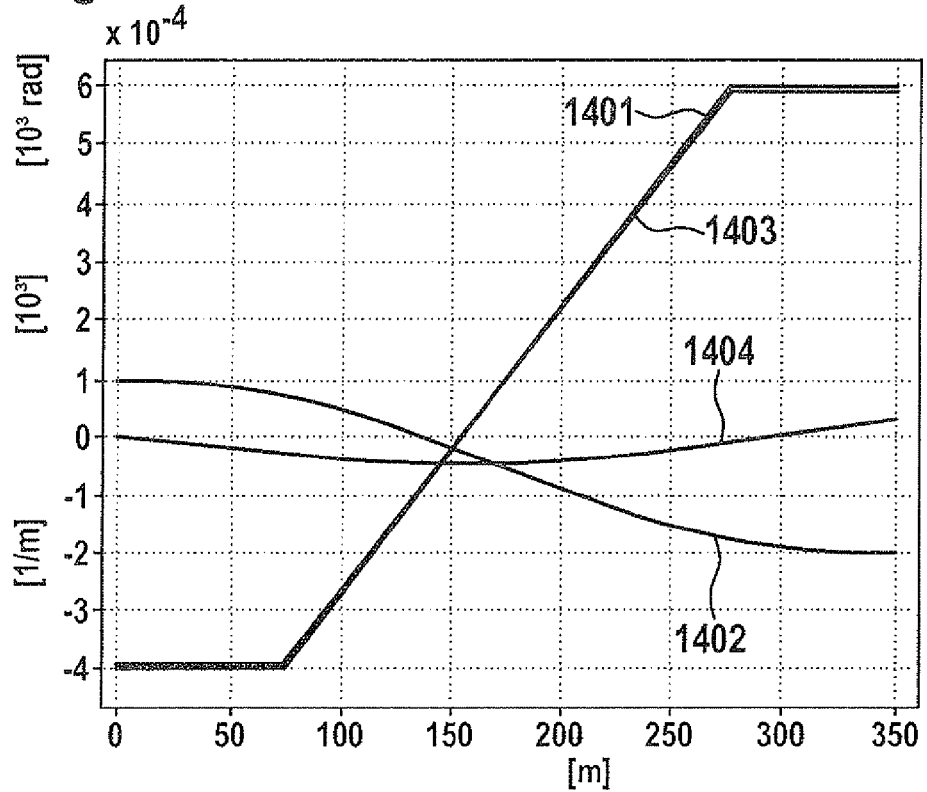
FIG. 14 shows a result of the trajectory planning operation for an S-bend, according to a further exemplary embodiment of the present invention.

FIG. 14 shows, as the result of the trajectory planning for an S-bend 1401, relative lateral offset 1402, curvature plot 1403 and yaw angle plot 1404.

The exemplary embodiments described and shown in the Figures have been chosen merely by way of example. Different exemplary embodiments may be combined with one another in their entirety or in respect of individual features. An exemplary embodiment may also be supplemented by features of a further exemplary embodiment.

Furthermore, method steps according to the present invention may be repeated and may be carried out in an order other than the order described.

Where an exemplary embodiment includes an "and/or" conjunction between a first feature and a second feature, this may be read in such a way the exemplary embodiment has, in accordance with one embodiment, both the first feature and the second feature and, in accordance with a further embodiment, either only the first feature or only the second feature.

What is claimed is:

1. A method for operating a lane keeping system of a vehicle which provides a vehicle trajectory guidance by determining a cutting trajectory that enables a curve section of a predefined road lane to be cut by the vehicle, the method comprising:
   receiving, by the lane keeping system, information about the curve section of the predefined road lane via an interface;
   dividing, by the lane keeping system, the curve section of the predefined road lane into at least one curve segment having a segment length and a start curvature, the curve segment being a straight-line segment or a circular arc segment or a curve segment whose curvature is a function of an arc length of the curve segment;

determining, by the lane keeping system, a cutting trajectory within the predefined road lane from the at least one curve segment, so that, at a specific point of the curve section of the predefined road lane, the cutting trajectory has a predetermined offset relative to a center of the predefined road lane; and providing, by the lane keeping system, a vehicle trajectory guidance along the determined cutting trajectory;

wherein the cutting trajectory is divided into a plurality of trajectory segments having a segment length and a start curvature, the start curvature corresponding to the end curvature of a preceding trajectory segment, and the curvature thereof either being constant over the arc length of the trajectory segment in the form of a straight-line segment or circular arc segment or changing linearly with the arc length of the trajectory segment in the form of a clothoid segment;

wherein the straight-line segment length, the clothoid segment length, the start curvature of the clothoid segment, a parameter of the clothoid segment, the circular arc segment length and the circular arc curvature are so adjusted that a maximum curvature of the clothoid segment trajectory and a curvature of the circular arc segment trajectory is in each case less than a maximum curvature of the curve section, and in which a straight-line trajectory is determined which is associated with the straight-line segment, a clothoid trajectory is determined which is associated with the clothoid segment, and a circular arc trajectory is determined which is associated with the circular arc segment, and in which the cutting trajectory is determined from the straight-line trajectory, the clothoid trajectory and the circular arc trajectory;

wherein the straight-line trajectory, the clothoid trajectory and the circular arc trajectory are determined taking into consideration a vehicle speed and a curve section curvature.

2. The method of claim 1, wherein the straight-line trajectory, the clothoid trajectory and the circular arc trajectory are so determined that the cutting trajectory has, at an apex of the curve section, a predetermined offset toward the inside of the curve relative to the center of the lane.

3. The method of claim 1, wherein the straight-line trajectory, the clothoid trajectory and the circular arc trajectory are so determined that an angular direction of the cutting trajectory at a start point corresponds to an angular direction of the center of the lane at a start point and an angular direction of the cutting trajectory at an end point corresponds to an angular direction of the center of the lane at an end point.

4. The method of claim 1, further comprising:
ascertaining a lateral guidance of the vehicle based on the cutting trajectory, the lateral guidance being suitable for steering the vehicle through the curve section along the cutting trajectory.

5. The method of claim 1, further comprising:
dividing a route section of the roadway into a plurality of curve sections representing a curve entry, a curve that becomes tighter or that opens out, an S-bend and/or a curve exit, and for each of the plurality of curve sections a cutting trajectory is determined, and a trajectory for the route section is formed by stringing together the cutting trajectories of the plurality of curve sections.

6. A method for operating a lane keeping system of a vehicle which provides a vehicle trajectory guidance by determining a cutting trajectory that enables a curve section of a predefined road lane to be cut by the vehicle, the method comprising:

receiving, by the lane keeping system, information about the curve section of the predefined road lane via an interface;

dividing, by the lane keeping system, the curve section of the predefined road lane into at least one curve segment having a segment length and a start curvature, the curve segment being a straight-line segment or a circular arc segment or a curve segment whose curvature is a function of an arc length of the curve segment;

determining, by the lane keeping system, a cutting trajectory within the predefined road lane from the at least one curve segment, so that, at a specific point of the curve section of the predefined road lane, the cutting trajectory has a predetermined offset relative to a center of the predefined road lane; and providing, by the lane keeping system, a vehicle trajectory guidance along the determined cutting trajectory;

wherein the cutting trajectory is divided into a plurality of trajectory segments having a segment length and a start curvature, the start curvature corresponding to the end curvature of a preceding trajectory segment, and the curvature thereof either being constant over the arc length of the trajectory segment in the form of a straight-line segment or circular arc segment or changing linearly with the arc length of the trajectory segment in the form of a clothoid segment;

wherein the straight-line segment length, the clothoid segment length, the start curvature of the clothoid segment, a parameter of the clothoid segment, the circular arc segment length and the circular arc curvature are so adjusted that a maximum curvature of the clothoid segment trajectory and a curvature of the circular arc segment trajectory is in each case less than a maximum curvature of the curve section, and in which a straight-line trajectory is determined which is associated with the straight-line segment, a clothoid trajectory is determined which is associated with the clothoid segment, and a circular arc trajectory is determined which is associated with the circular arc segment, and in which the cutting trajectory is determined from the straight-line trajectory, the clothoid trajectory and the circular arc trajectory;

wherein in a region directly adjoining the curve section, at least one further circular arc trajectory is determined so that a further curve trajectory has, in the region, a further predetermined offset relative to the center of the lane.

7. A lane keeping system of a vehicle which provides a vehicle trajectory guidance by determining a cutting trajectory that enables a curve section of a predefined road lane to be cut by the vehicle, comprising:

a receiving arrangement to receive information about the curve section of the predefined road lane via an interface;

a dividing arrangement to divide the curve section of the predefined road lane into at least one curve segment having a segment length and a start curvature, the curve segment being a straight-line segment or a circular arc segment or a curve segment whose curvature is a function of an arc length of the curve segment;

a determining arrangement to determine a cutting trajectory within the predefined road lane from the at least one curve segment, so that, at a specific point of the curve section of the predefined road lane, the cutting trajectory has a predetermined offset relative to a center of the predefined road lane; and a control arrangement to provide a vehicle trajectory guidance along the determined cutting trajectory;

wherein the cutting trajectory is divided into a plurality of trajectory segments having a segment length and a start curvature, the start curvature corresponding to the end curvature of a preceding trajectory segment, and the curvature thereof either being constant over the arc length of the trajectory segment in the form of a straight-line segment or circular arc segment or changing linearly with the arc length of the trajectory segment in the form of a clothoid segment;

wherein the straight-line segment length, the clothoid segment length, the start curvature of the clothoid segment, a parameter of the clothoid segment, the circular arc segment length and the circular arc curvature are so adjusted that a maximum curvature of the clothoid segment trajectory and a curvature of the circular arc segment trajectory is in each case less than a maximum curvature of the curve section, and in which a straight-line trajectory is determined which is associated with the straight-line segment, a clothoid trajectory is determined which is associated with the clothoid segment, and a circular arc trajectory is determined which is associated with the circular arc segment, and in which the cutting trajectory is determined from the straight-line trajectory, the clothoid trajectory and the circular arc trajectory;

wherein the straight-line trajectory, the clothoid trajectory and the circular arc trajectory are determined taking into consideration a vehicle speed and a curve section curvature.

8. A non-transitory, computer readable medium having a computer program, which is executable by a processor, comprising:

a program code arrangement having program code for operating a lane keeping system of a vehicle which provides a vehicle trajectory guidance by determining a cutting trajectory that enables a curve section of a predefined road lane to be cut by the vehicle, by performing the following:

receiving, by the lane keeping system, information about the curve section of the predefined road lane via an interface;

dividing, by the lane keeping system, the curve section of the predefined road lane into at least one curve segment having a segment length and a start curvature, the curve segment being a straight-line segment or a circular arc segment or a curve segment whose curvature is a function of an arc length of the curve segment;

determining, by the lane keeping system, a cutting trajectory within the predefined road lane from the at least one curve segment, so that, at a specific point of the curve section of the predefined road lane, the cutting trajectory has a predetermined offset relative to a center of the predefined road lane; and providing, by the lane keeping system, a vehicle trajectory guidance along the determined cutting trajectory;

wherein the cutting trajectory is divided into a plurality of trajectory segments having a segment length and a start curvature, the start curvature corresponding to the end curvature of a preceding trajectory segment, and the curvature thereof either being constant over the arc length of the trajectory segment in the form of a straight-line segment or circular arc segment or changing linearly with the arc length of the trajectory segment in the form of a clothoid segment;

wherein the straight-line segment length, the clothoid segment length, the start curvature of the clothoid segment, a parameter of the clothoid segment, the circular arc segment length and the circular arc curvature are so adjusted that a maximum curvature of the clothoid segment trajectory and a curvature of the circular arc segment trajectory is in each case less than a maximum curvature of the curve section, and in which a straight-line trajectory is determined which is associated with the straight-line segment, a clothoid trajectory is determined which is associated with the clothoid segment, and a circular arc trajectory is determined which is associated with the circular arc segment, and in which the cutting trajectory is determined from the straight-line trajectory, the clothoid trajectory and the circular arc trajectory;

wherein the straight-line trajectory, the clothoid trajectory and the circular arc trajectory are determined taking into consideration a vehicle speed and a curve section curvature.

\* \* \* \* \*